US012662014B2

(12) United States Patent
Maier

(10) Patent No.: US 12,662,014 B2
(45) Date of Patent: Jun. 23, 2026

(54) MONITORING DEVICE AND METHOD FOR MONITORING A CLOSED STATE OF A BATTERY SWITCH, INVERTER DEVICE, ELECTRIC AXLE DRIVE AND MOTOR VEHICLE

(71) Applicant: ZF Friedrichshafen AG, Friedrichshafen (DE)

(72) Inventor: Robert Maier, Neudrossenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/927,545

(22) Filed: Oct. 25, 2024

(65) Prior Publication Data

US 2025/0135941 A1 May 1, 2025

(30) Foreign Application Priority Data

Oct. 25, 2023 (DE) ...................... 10 2023 210 504.7

(51) Int. Cl.
B60L 50/60 (2019.01)
B60L 58/10 (2019.01)

(52) U.S. Cl.
CPC ............... B60L 58/10 (2019.02); B60L 50/60 (2019.02); B60L 2210/42 (2013.01)

(58) Field of Classification Search
CPC ...... B60L 58/10; B60L 50/60; B60L 2210/42; B60L 3/0046; B60L 3/0084; B60L 3/0023; G01R 31/3277; H02J 7/0047; H02J 2207/20
See application file for complete search history.

(56) References Cited

U.S. PATENT DOCUMENTS 10,429,427 B2 10/2019 Fink et al.
2014/0028322 A1* 1/2014 Tzivanopoulos .. G01R 31/3277
324/433

FOREIGN PATENT DOCUMENTS

DE     10 2010 036 941 A1     2/2012
DE        102011013754 A1 *     9/2012 ............. B60K 6/387
DE     10 2012 213 159 A1     1/2014
DE     10 2021 214 533 A1     6/2023

OTHER PUBLICATIONS

German Office Action with Search Report in Corresponding German Application No. DE 10 2023 210 504.7, dated Sep. 11, 2024 (16 pages).

* cited by examiner

*Primary Examiner* — Elim Ortiz
(74) *Attorney, Agent, or Firm* — Crowell & Moring LLP

(57) ABSTRACT

A monitoring device for monitoring an on/off state of a battery switch that has a power source, a diode connected in series to the power source, and an evaluation circuit. The power source and diode are connected in parallel to the battery circuit. The power source is configured to generate a current or voltage between a first terminal and second terminal of the battery switch. The evaluation circuit is designed to create an evaluation signal based on the voltage between the diode and the power source that indicates the on/off state of the battery switch.

14 Claims, 5 Drawing Sheets

500

MONITORING DEVICE AND METHOD FOR MONITORING A CLOSED STATE OF A BATTERY SWITCH, INVERTER DEVICE, ELECTRIC AXLE DRIVE AND MOTOR VEHICLE

CROSS-REFERENCE TO RELATED APPLICATION

This application claims priority to German Patent Application No. 10 2023 210 504.7, filed on Oct. 25, 2023, the entirety of which is hereby fully incorporated by reference herein.

TECHNICAL FIELD

The present disclosure relates to a monitoring device and a method for monitoring the on/off state of a battery switch, an inverter device, an electric axle drive, and a motor vehicle.

SUMMARY

An intermediate circuit in an inverter can be discharged passively or actively. A battery switch can be placed between a battery and the intermediate circuit.

Based on this, the present disclosure results in an improved monitoring device and an improved method for monitoring the on/off state of a battery switch, an improved inverter device, an improved axle drive, and an improved motor vehicle, in accordance with various embodiments. Advantageous embodiments can also be derived from the following description.

The advantages obtained with the approach proposed herein are that a monitoring device is created that can reliably and quickly monitor the on/off state of a battery switch.

A monitoring device is used to monitor the on/off state of a battery switch. The battery switch has a first terminal connecting the switch to a pole on a battery, and a second terminal for connecting the switch to a pole on an intermediate circuit. The monitoring device contains a power source and a diode connected in a series, and an evaluation circuit. The power source has a first terminal and a second terminal. The power source is designed to generate a current or voltage between the first and second terminals on the battery switch. The diode has a first and second terminal. The first terminal on the diode is connected to the second terminal on the power source. The evaluation circuit is designed to create an evaluation indicating the on/off state of the battery switch signal based on the voltage at the first terminal on the diode.

The on/off state indicates whether or not the battery can be disconnected from the intermediate circuit. This has advantages regarding an active discharge of the intermediate circuit. The approach presented herein can therefore be understood to be a monitoring of the battery disconnection.

The battery switch can be placed in the line connecting the battery to the intermediate circuit. The poles on the battery and intermediate circuit can either both be positive or both be negative poles. A test voltage can be applied by the power source to the switch, or a test current can be conducted through the switch to identify the on/off state. The value of the voltage obtained with the test voltage or current at a pickup point where the diode and power source are connected, which is dependent on the state of the switch, and from which the evaluation signal can be generated, can be used for this. The evaluation circuit can be designed to generate a signal with either a first value, indicating the switch is on, or a second value, indicating the switch is off, based on the voltage at the pickup point.

The diode can contain a cathode and an anode. The first terminal on the diode can be the anode, and the second can be the cathode. The voltage in the battery can be blocked by the diode.

The evaluation circuit can contain a comparator. The comparator can have a first input, a second input, and an output. The comparator can be connected by the first input to the first terminal on the diode, and by the second input to a reference voltage terminal. The comparator can be designed to provide the evaluation signal to the output. The comparator can reliably and quickly compare a voltage indicating the state of the switch with a reference voltage for the reference voltage terminal.

The first power source terminal can be connected to the second switch terminal, and the second diode terminal can be connected to the first switch terminal. This has advantages if the switch for the battery is between the positive poles on the battery and the intermediate circuit.

The first power source terminal could also be connected to the first switch terminal, and the second diode terminal can be connected to the second switch terminal. This has advantages if the switch for the battery is between the negative poles on the battery and the intermediate circuit.

The power source can be a current source. It could also be a voltage source. This simplifies the selection of an appropriate power source.

The power source can have a first resistor, second resistor, and a supply voltage collector. The first resistor can be between the supply voltage collector and the second power source terminal. The second resistor can be between the first and second power source terminals. This results in a power source that forms a voltage source with a simple resistor divider.

There can be a third resistor in the series circuit. The third resistor can be integrated at an appropriate point in the series circuit. The third resistor can have a high amperage, ensuring reliable functioning of the monitoring device, e.g. during recuperation.

The diode can be between the third resistor and the power source. This ensures that the monitoring device functions reliably.

The battery switch can be in the monitoring device. The first terminal on the switch connects it to the pole on the battery, and the second terminal connects the switch to the pole on the intermediate circuit. This monitoring device can therefore function as a switch unit.

An inverter device contains the monitoring device described above. It also contains an intermediate circuit and an inverter for converting battery voltage into drive voltage. The intermediate circuit is between the battery switch and the inverter. It can be a current converter, e.g. an inverter.

An electric axle drive for a motor vehicle contains an electric machine, a transmission, and the inverter device described above. The inverter device can provide the electrical current necessary for operating the electric machine. The transmission can convert a torque from the electric machine into a drive torque for at least one of the wheels on the motor vehicle. The transmission can contain reduction gearing for the rotational rate of the electric machine as well as a differential.

The vehicle can contain the aforementioned inverter device and/or electric axle drive.

The present disclosure also results in a method for monitoring the on/off state of a battery switch. The switch has a first terminal connecting the switch to a battery and a second terminal connecting the switch to an intermediate circuit. The method is executed with a power source and diode connected in series, and an evaluation circuit. This series circuit is parallel to the battery switch. The power source has first and second terminals. The diode has first and second terminals, the first of which is connected to the second terminal on the power source. The method comprises a generating step and a provision step. In the generating step, current or voltage is generated between the first and second terminals on the battery switch. An evaluation signal is provided in the provision step, indicating the state of the switch. The provision step makes use of the evaluation circuit and the voltage at the first diode terminal.

The present disclosure shall be explained in greater detail below in reference to the drawings.

DETAILED DESCRIPTION

The same or similar reference symbols are used in the following description of preferred exemplary embodiments of the present disclosure for the elements having similar functions shown in the different figures, without repeating the descriptions of these elements.

Figure 1:
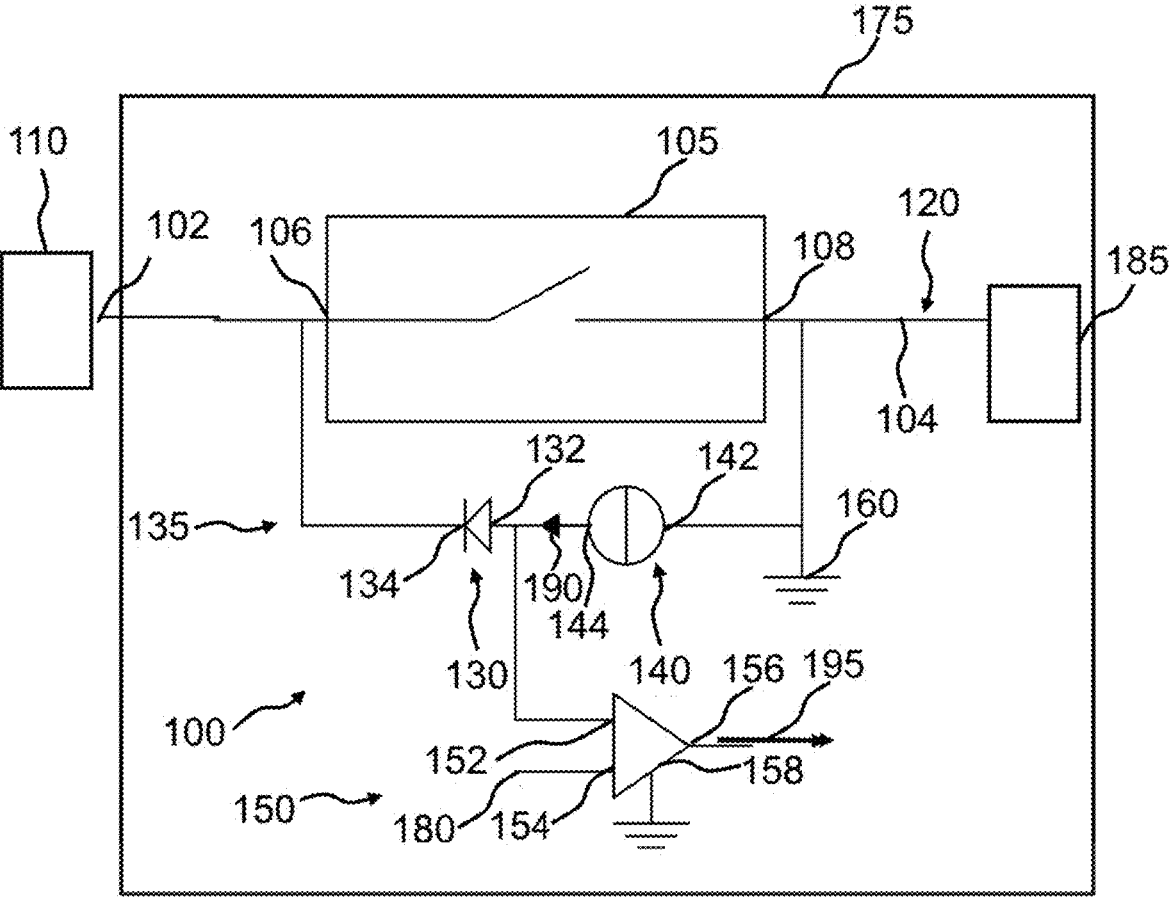
FIG. 1 shows a circuit diagram of an exemplary embodiment of a monitoring device.

FIG. 1 shows a circuit diagram of an exemplary embodiment of a monitoring device 100. The monitoring device 100 is designed to monitor the on/off state of a battery switch 105. The switch 105 is used in this exemplary embodiment to connect a battery 110 to an intermediate circuit 120. A first terminal 106 on the switch 105 is connected to a first pole 102 on the battery 110, and a second terminal 108 on the switch 105 is connected to a first pole 104 on the intermediate circuit 120.

The connections in the monitoring device 100 are merely exemplary, and shown as part of an inverter device 175. The inverter device 175 contains an inverter 185 for inverting or converting voltage in the battery 110 or intermediate circuit 120 to drive voltage that can be used to operate an electric machine.

Figure 5:
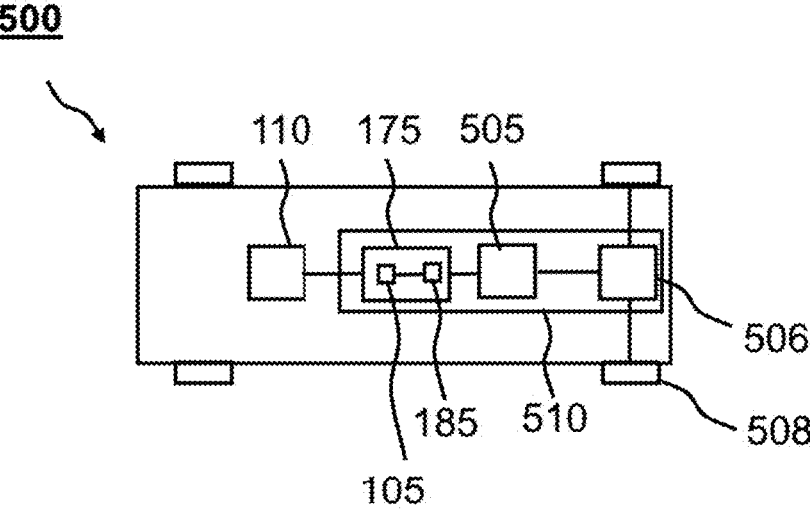
FIG. 5 shows a schematic illustration of an exemplary embodiment of a motor vehicle.

In one exemplary embodiment, the battery 110 is the primary means of storing electricity in an electric drive train for a vehicle. The electricity stored in the battery 110 is converted by the inverter device 175 and supplied to an electric machine, as shown in FIG. 5. The inverter device 175 needs an intermediate storage circuit 120 for this. There is a mechanical or electrical switch 105 between the battery 110 and the intermediate circuit 120, such that even when the battery 110 is charged, the inverter 185 can be disconnected therefrom. In the event of a malfunction, the battery 110 is disconnected from the rest of the system, and the voltage in the intermediate circuit 120 is discharged. For safety reasons, this results in two discharging means. Passive discharging is obtained with ohmic voltage distribution between the positive and negative poles in the intermediate circuit. To keep losses low in the passive discharge, it takes a long time, e.g. six minutes, to sufficiently discharge the voltage in the intermediate circuit capacitor, typically to less than 60 volts. A second measure is formed by active discharging. In this case the intermediate circuit 120 is sufficiently discharged quickly, e.g. within two seconds, after it has been disconnected from the battery 110. This path is not permanently engaged, due to the otherwise high losses, and is first activated once the battery 110 is securely disconnected.

If the switch 105 has not reliably disconnected the battery 110, such that it is still connected to the intermediate circuit 120, active discharge does not take place, or can be stopped quickly.

To be able to reliably determine the state of the switch 105, the monitoring device 100 contains a series circuit 135 comprising a diode 130 and a power source 140, and an evaluation circuit 150. This series circuit 135 is connected in parallel to the battery switch 105.

Different exemplary embodiments of the monitoring device 100 contain only the series circuit 135 and the evaluation circuit 150, and/or the battery switch 105.

The power source 140 has a first terminal 142 and a second terminal 144. The power source 140 forms a current source that generates a current between the first terminal 106 and second terminal 108 on the battery switch 105. The first power source terminal 142 is connected to the second switch terminal 104. A ground terminal 160 is connected, merely by way of example, between the first power source terminal 142 and the second switch terminal 108.

The diode 130 has a first terminal 132 and second terminal 134. The first terminal 132 is an anode, and the second terminal 134 is a cathode, by way of example. The first terminal 132 is connected to the second power source terminal 144, and the second terminal 134 is connected to the first switch terminal 106. The diode 130 is therefore connected to the first switch terminal 108 when the switch is off.

The evaluation circuit 150 is designed to generate an evaluation signal 195 based on the voltage at a pickup point. The evaluation signal 195 indicates the state of the switch 105. The pickup point is in the connection between the first diode terminal 132 and the second power source terminal 144. The voltage signal used to generate the evaluation signal 195 therefore corresponds to the voltage at both the first diode terminal 132 and the second power source terminal 144. The evaluation circuit 150 contains circuitry for generating the evaluation signal 195 based on the voltage level.

In one exemplary embodiment, the evaluation circuit 150 contains a comparator 158. The comparator 158 has a first input 152, a second input 154, and an output 156. The comparator 158 is connected to the first diode terminal 132 by the first input 152. The second input 154 connects the comparator 158 to a reference voltage terminal 180. The comparator 158 is designed to provide the evaluation signal 195 to the output 156 based on a voltage at the first input 152 and a voltage at the reference voltage terminal 180. The comparator 158 can be grounded.

In one exemplary embodiment, the first pole 102 on the battery switch 105 and the first pole 104 on the intermediate circuit 120 are positive.

When the switch 105 is on, electricity is conducted from the power source 140 in the direction 190 to the first switch terminal 106, and through the switch 105 to the second terminal 108. In this state, the battery 110 is connected to the intermediate circuit 120.

The intermediate circuit 120 can be quickly discharged actively. This active discharge is first carried out when the battery 110 is disconnected from the intermediate circuit 120. The switch 105 is turned off for this, such that no current flows through it. The diode 130 blocks the current in this direction. Instead, voltage is applied to the power source 140. This voltage is detected by the evaluation circuit 150, e.g. in the comparator 158, and used to generate the evaluation signal 195. The evaluation signal 195 indicates when the battery 110 has been disconnected. The active discharge of the intermediate circuit 120 can then take place.

The approach presented herein results in a method for checking whether the battery 110 has been disconnected from the intermediate circuit 120, before initiating active discharge. This prevents active discharge when the battery 110 is still connected to the intermediate circuit. This prevents high losses, and the switching components can be tailored in accordance with their functions.

The approach presented herein is based on the idea of checking for continuity. In one exemplary embodiment, there is normally a gate driver for power electronics for detecting a short circuit resulting in desaturation. Desaturation detection is used for the continuity check. The monitoring device 100, which can also be referred to as a circuit, is connected to the terminals 106, 108 on the switch 105 for disconnecting the battery 110.

FIG. 1 shows one exemplary embodiment of the monitoring device 100 for detecting the disconnection from the intermediate circuit 120. If the switch 105 is on, current from the power source 104, which can also be referred to as an iDESAT, can flow through the diode 130 and the switch 105, and voltage is not accumulated. If the switch is off, the diode 130 blocks the battery blocking voltage, and the current does not flow in the iDESAT. The maximum available voltage from the power source 104 is set at the output from the power source 104 that can be detected by the comparator 158. The evaluation signal 195, which can also be referred to as the vID, indicates whether the battery 110 has been disconnected. If a command to disconnect the battery 110 has been issued, and the switch cannot be switched off due to a malfunction, this is detected, and the active discharge is not initiated.

Figure 2:
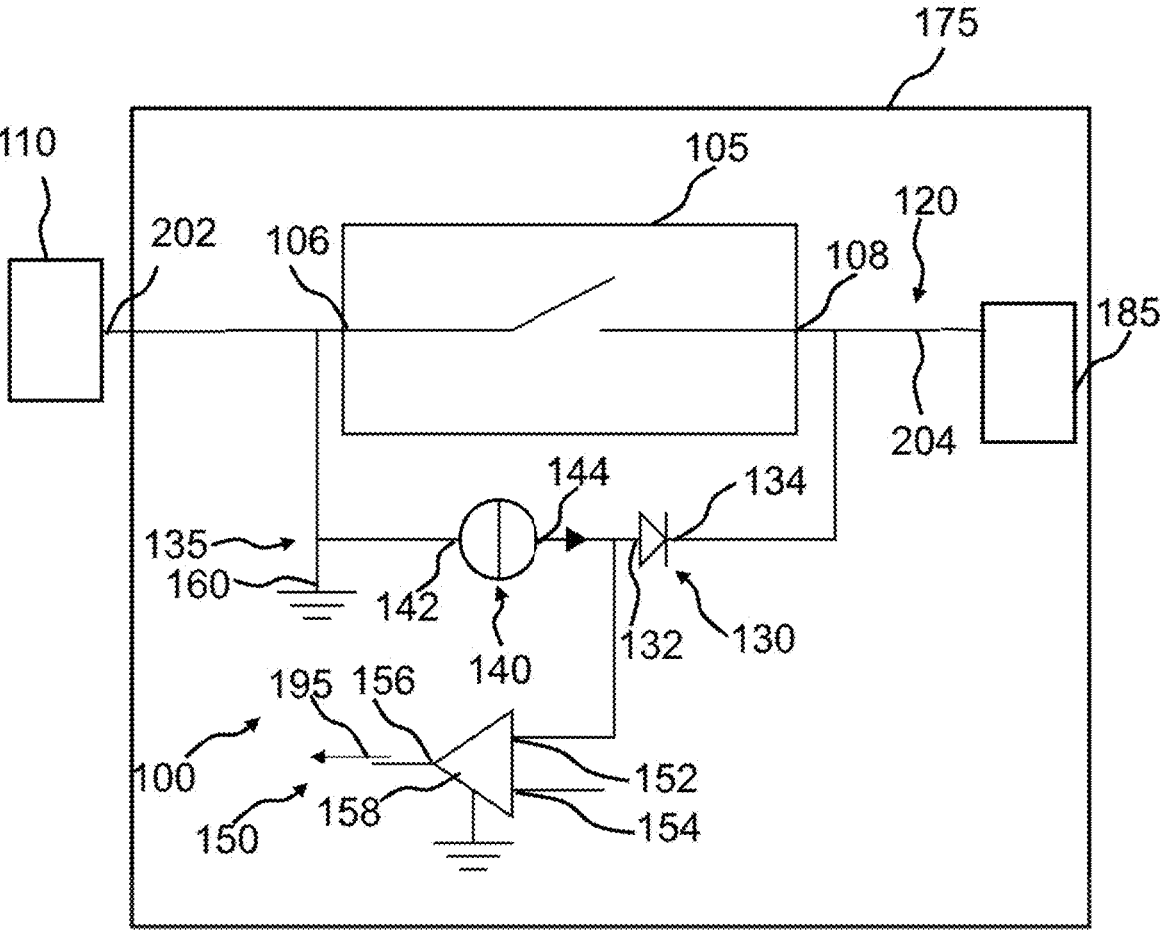
FIG. 2 shows a circuit diagram of an exemplary embodiment of a monitoring device.

FIG. 2 shows a circuit diagram of one exemplary embodiment of a monitoring device 100. The monitoring device 100 is similar to that in FIG. 1, but has been designed for the case in which the switch 105 is placed between a second pole 202 on the battery 110 and a second pole 204 on the intermediate circuit 120, each of which are negative poles 202, 204. The first power source terminal 142 is therefore connected to the first switch terminal 106, and the second diode terminal 134 is connected to the second switch terminal 108.

The evaluation circuit 150 corresponds to that in FIG. 1, and generates the evaluation signal 195 based on the voltage at a pickup point between the first diode terminal 132 and the second power source terminal 144.

The monitoring device in FIG. 2 is therefore set up for when the switch 105 is located in the connection between negative poles.

The reference potential for the monitoring device in the exemplary embodiment shown in FIG. 1 is always the positive pole on the intermediate circuit 120, while in FIG.

2, the negative pole on the battery 110 forms the reference potential for the monitoring device 100.

Figure 3:
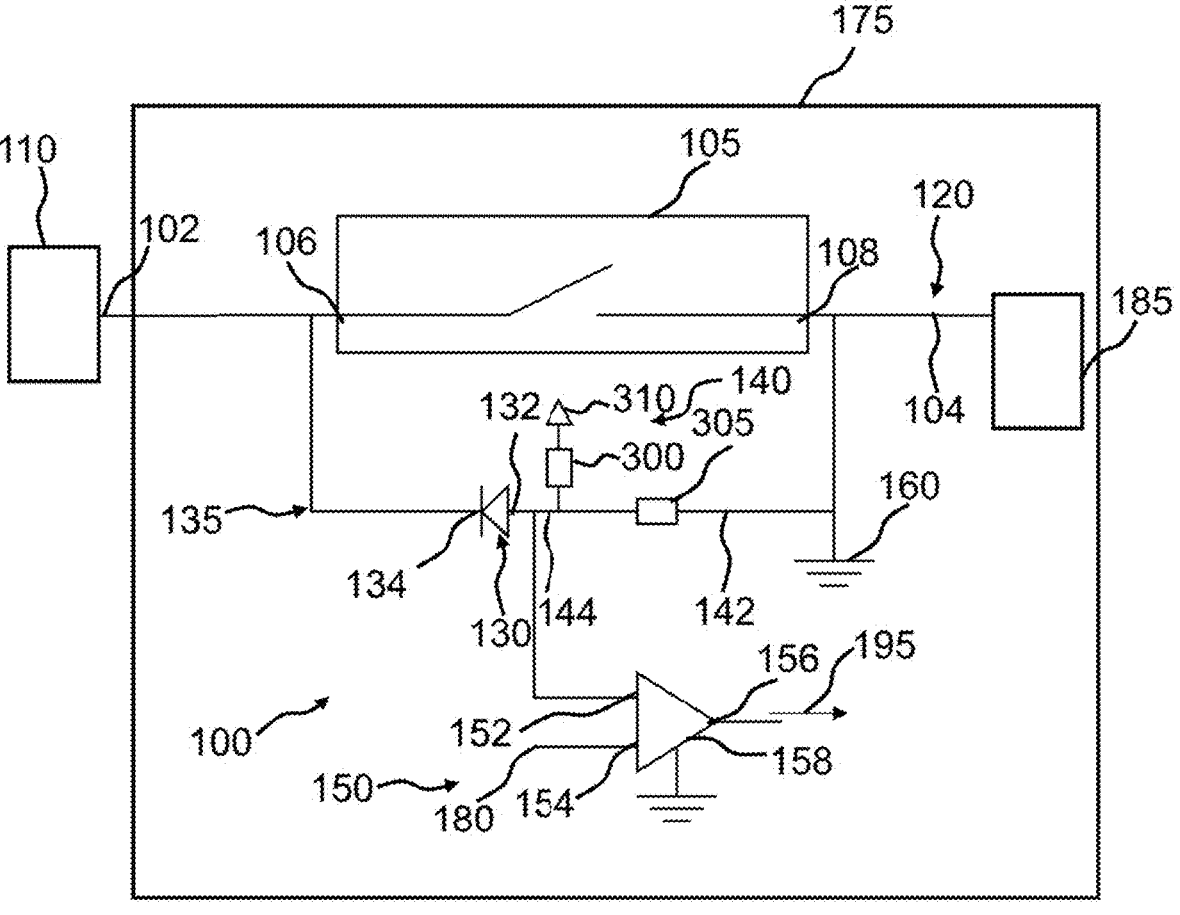
FIG. 3 shows a circuit diagram of an exemplary embodiment of a monitoring device.

FIG. 3 shows a circuit diagram for an exemplary embodiment of a monitoring device 100. The monitoring device 100 is similar to that in FIG. 1, with the exception that the power source 140 is a voltage source.

The first pole 102 on the battery 110 and first pole 104 on the intermediate circuit 120 are each positive.

The power source 140 in one exemplary embodiment contains a first resistor 300, a second resistor 305, and a supply voltage collector 310, also referred to as a Vcc. The first resistor 300, also referred to as R1, is placed between the supply voltage collector 310 and the second power source terminal 144. The second resistor, also referred to as R2, is between the first power source terminal 142 and the second power source terminal 144. The first resistor 300 and second resistor 305 form a voltage divider.

In other words, instead of the iDESAT forming a power source, a voltage source with a high-impedance voltage divider is used in FIG. 3. If the battery switch 105 is on, the voltage at the first resistor 300, i.e. the voltage in the Vcc, drops, and there is no voltage at the input 152 for the comparator 158. When the switch is on, the voltage is divided between the first resistor 300 and second resistor 305, such that there is a voltage at the input 152 for the comparator 158 that can be adjusted by the resistance divider.

Figure 4:
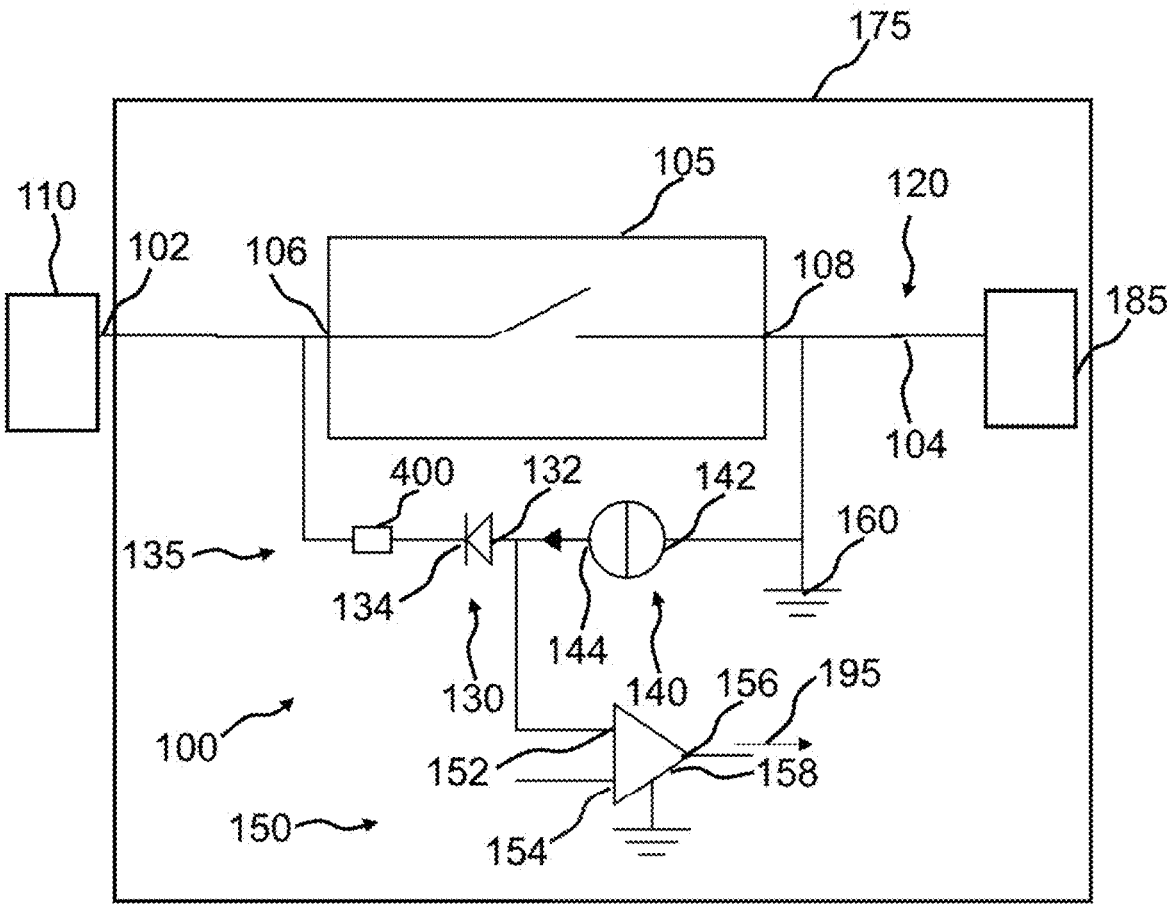
FIG. 4 shows a circuit diagram of an exemplary embodiment of a monitoring device.

FIG. 4 shows a circuit diagram for an exemplary embodiment of a monitoring device 100. The monitoring device 100 is similar to that in FIG. 1, with the exception that the series circuit 135 contains a third resistor 400.

The first pole 102 on the battery 110 and the first pole 104 on the intermediate circuit 120 are both positive.

The diode 130 is between the third resistor 400 and the power source 140.

As soon as the battery 110 is disconnected from the intermediate circuit 120, no recuperation takes place, or the transfer of electricity from the electric machine to the intermediate circuit is prevented, because the recuperated electricity from the rotation of the electric machine would otherwise overload the intermediate circuit 120. The intermediate circuit 120 can nevertheless be charged slightly higher than the battery 110. It can be expected that when in use, the voltage in the intermediate circuit exceeds that in the battery, which can also take place during recuperation, without disconnecting the battery, for which reason the third resistor 400 is added, which can also be referred to as a high-impedance resistor R3. The amperage in the power source iDESAT, the reference voltage terminal 180, which can also be referred to as uRef, and the resistance R3 at the third resistor 400 are synched to one another to ensure reliable operation of the monitoring device 100.

The exemplary embodiments described in reference to FIGS. 1 to 4 can be combined with one another. By way of example, the current source iDESAT in FIGS. 1, 2 and 4 can be replaced by the supply voltage collector Vcc that has the first and second resistors in FIG. 3 while connecting to the negative pole connection between the battery 110 and intermediate circuit 120 in FIG. 2.

FIG. 5 shows a schematic illustration of an exemplary embodiment of a motor vehicle 500.

The motor vehicle 500 has an electric axle drive 510 with an electric machine 505. Electricity for operating the electric machine 505 is supplied by a power supply, e.g. a battery 110. The battery provides direct current, which is then converted by an inverter device 175 to alternating current, e.g. a three-phase alternating current, and supplied to the electric machine. A shaft driven by the electric machine 505 is connected to at least one wheel 508 in the motor vehicle 500, either directly or by a transmission 506. The motor vehicle 500 is powered by the electric machine in this manner. In one exemplary embodiment, the electric axle drive 510 has a housing that contains the inverter 175, electric machine 505, and transmission 506.

The inverter device 175 contains the inverter 185 for converting the battery voltage to drive voltage, and the battery switch 105. This switch 105 is connected by an intermediate circuit to the inverter 185. The switch 105 connects the battery 110 to the intermediate circuit in the converter 185.

Figure 6:
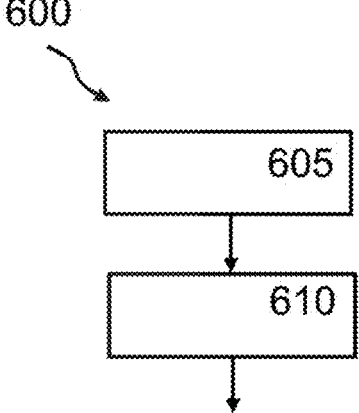
FIG. 6 shows a flow chart for an exemplary embodiment of a method for monitoring an on/off state of a battery switch.

FIG. 6 shows a flow chart for an exemplary embodiment of a method 600 for monitoring the on/off state of a battery switch. The switch is that described in reference to the drawings described above. The method 600 comprises a generating step 605 and a provision step 610. A current or voltage is generated between the first and second terminals on the battery in the generating step 605. The generating step 605 is executed with the power source.

An evaluation signal indicating the on/off state of the battery switch is created in the provision step 610. This step 610 is executed by the evaluation circuit, based on a voltage at the first diode terminal.

REFERENCE SYMBOLS 100 monitoring device
102 first pole on the battery
104 first pole on the intermediate circuit
105 battery switch
106 first terminal on the battery switch
108 second terminal on the battery switch
110 battery
120 intermediate circuit
130 diode
132 first diode terminal
134 second diode terminal
135 series circuit
140 power source
142 first power source terminal
144 second power source terminal
150 evaluation circuit
152 first input
154 second input
156 output
158 comparator
160 ground terminal
175 inverter
180 reference voltage terminal
185 inverter
190 flow direction
195 evaluation signal
202 second pole on the battery
204 second pole on the intermediate circuit
300 first resistor
305 second resistor
310 supply voltage collector
400 third resistor
500 motor vehicle
505 electric machine
506 transmission
508 wheel
510 electric axle drive
600 method for monitoring an on/off state of a battery switch 605 generating step
610 provision step

The invention claimed is:

1. A monitoring device for monitoring an on/off state of a battery switch, wherein the battery switch has a first terminal for connecting the battery switch to a pole on a battery, and a second terminal for connecting the battery switch to a pole on an intermediate circuit, wherein the monitoring device comprises:

a series circuit with a power source and a diode, wherein the series circuit is connected in parallel to the battery switch;

the power source, which has a first terminal and a second terminal, wherein the power source is configured to generate a current or voltage between the first terminal and the second terminal of the battery switch;

the diode, which has a first terminal and a second terminal, wherein the first terminal of the diode is connected to the second terminal of the power source; and an evaluation circuit configured to create an evaluation signal based on a voltage at the first terminal of the diode, which indicates the on/off state of the battery switch, wherein the evaluation circuit comprises a comparator, wherein the comparator has a first input, a second input, and an output, wherein the comparator is connected by the first input to the first terminal of the diode, and by the second input to a reference voltage terminal, wherein the comparator is configured to provide the evaluation signal at the output.

2. The monitoring device according to claim 1, wherein the diode has a cathode and an anode, wherein the first terminal of the diode is the anode, and the second terminal of the diode is the cathode.

3. The monitoring device according to claim 1, wherein the first terminal of the power source is connected to the second terminal of the battery switch, and wherein the second terminal of the diode is connected to the first terminal of the battery switch.

4. The monitoring device according to claim 1, wherein the first terminal of the power source is connected to the first terminal of the battery switch, and wherein the second terminal of the diode is connected to the second terminal of the battery switch.

5. The monitoring device according to claim 1, wherein the power source is a current source.

6. The monitoring device according to claim 1, wherein the power source is a voltage source.

7. The monitoring device according to claim 1, wherein the power source comprises a first resistor, a second resistor, and a supply voltage collector, wherein the first resistor is between the supply voltage collector and the second terminal of the power source, and wherein the second resistor is between the first terminal of the power source and the second terminal of the power source.

8. The monitoring device according to claim 7, wherein the series circuit comprises a third resistor.

9. The monitoring device according to claim 8, wherein the diode is between the third resistor and the power source.

10. The monitoring device according to claim 1, comprising:

the battery switch comprising the first terminal for connecting the battery switch to the pole on the battery, and the second terminal for connecting the battery switch to the pole on the intermediate circuit.

11. An inverter device comprising:

the monitoring device according to claim 10, which has the intermediate circuit; and an inverter configured to convert battery voltage to drive voltage, wherein the intermediate circuit is between the battery switch and the inverter.

12. An electric axle drive for a motor vehicle comprising:

at least one electric machine;

a transmission; and the inverter device according to claim 11.

13. A motor vehicle comprising:

the inverter device according to claim 11.

14. A method of monitoring an on/off state of a battery switch, wherein the battery switch has a first terminal for connecting the switch to a pole on a battery, and a second terminal for connecting the switch to a pole on an intermediate circuit, wherein the method is executed with a series circuit that contains a power source and a diode, and with an evaluation circuit, wherein the series circuit is connected in parallel to the battery switch, wherein the power source has a first terminal and a second terminal, wherein the diode has a first terminal and a second terminal, wherein the first terminal of the diode is connected to the second terminal of the power source, and the method comprising:

generating a current or voltage between the first terminal of the battery switch and the second terminal of the battery switch with the power source; and providing an evaluation signal indicating the on/off state of the battery switch by the evaluation circuit based on a voltage at the first terminal of the diode, wherein the evaluation circuit comprises a comparator, wherein the comparator has a first input, a second input, and an output, wherein the comparator is connected by the first input to the first terminal of the diode, and by the second input to a reference voltage terminal, the method comprising:

providing the evaluation signal by the comparator at the output of the comparator.

* * * * *